United States Patent [19]

Chan

[11] Patent Number: 5,019,354
[45] Date of Patent: May 28, 1991

[54] FLUID CATALYTIC CRACKING CATALYST-VAPOR SEPARATOR

[75] Inventor: Henry C. Chan, Bellaire, Tex.

[73] Assignee: Texaco Inc., White Plains, N.Y.

[21] Appl. No.: 551,366

[22] Filed: Jul. 12, 1990

[51] Int. Cl.[5] .................. F27B 15/10; F27B 15/12; F27B 15/02

[52] U.S. Cl. .................................... 422/145; 55/399; 422/139; 422/147

[58] Field of Search .................. 422/145, 147, 139; 55/399

[56] References Cited

U.S. PATENT DOCUMENTS

| 3,513,642 | 5/1970 | Cornett | 55/399 |
| 3,607,129 | 9/1971 | Carson | 422/147 X |
| 3,677,715 | 7/1972 | Morrison et al. | 422/147 X |
| 3,785,782 | 1/1974 | Cartmell | 422/147 X |

FOREIGN PATENT DOCUMENTS

| 460337 | 5/1928 | Fed. Rep. of Germany | 55/399 |
| 0380571 | 6/1973 | U.S.S.R. | 55/399 |

Primary Examiner—Robert J. Warden
Assistant Examiner—Amalia L. Santiago
Attorney, Agent, or Firm—Jack H. Park; Kenneth R. Priem; Richard A. Morgan

[57] ABSTRACT

In a fluid catalytic cracking process, a new separator apparatus has been invented for separating catalyst from cracked vapor. The separator comprises a downwardly spiraling channel. The separator demonstrates good separation efficiency even at turn down flow rates.

5 Claims, 1 Drawing Sheet

FLUID CATALYTIC CRACKING CATALYST-VAPOR SEPARATOR

FIELD OF THE INVENTION

This invention relates to an apparatus for rapidly separating catalyst from vapor in the hot, high velocity reactor discharge in a fluid catalytic cracking process.

DESCRIPTION OF OTHER RELATED METHODS IN THE FIELD

A number of fluid catalytic cracking (FCC) processes are known in the art. State of the art commercial catalytic cracking catalysts for these processes are highly active and possess high selectivity for conversion of selected hydrocarbon charge stocks to desired products. With such active catalysts it is generally preferable to conduct catalytic cracking reactions in a dilute phase transport type reaction system with a relatively short period of contact between the catalyst and the hydrocarbon feedstock, e.g. 0.2 to 10 seconds.

The control of short contact times, optimum for state of the art catalysts in dense phase fluidized bed reactors is not feasible. Consequently, catalytic cracking systems have been developed in which the primary cracking reaction is carried out in a transfer line reactor or riser reactor. In such systems, the catalyst is dispersed in the hydrocarbon feedstock and passed through an elongated reaction zone at relatively high velocity. In these transfer line reactor systems, vaporized hydrocarbon cracking feedstock acts as a carrier for the catalyst. In a typical upflow riser reactor, the hydrocarbon vapors move with sufficient velocity as to maintain the catalyst particles in suspension with a minimum of back mixing of the catalyst particles with the gaseous carrier. Thus development of improved fluid catalystic cracking catalysts has led to the development and utilization of reactors in which the reaction is carried out with the solid catalyst particles in a relatively dilute phase with the catalyst dispersed or suspended in hydrocarbon vapors undergoing reaction, e.g., cracking.

The cracking reactions are conveniently carried out in high velocity transport line reactors wherein the catalyst is moved from one vessel to another by the hydrocarbon vapors. Such reactors have become known in the art as risers or riser reactors. The catalyst and hydrocarbon mixture passes from the transfer line reactor into a first separation zone in which hydrocarbon vapors are separated from the catalyst. The catalyst particles are then passed into a second separation zone, usually a dense phase fluidized bed stripping zone wherein further separation of hydrocarbons from the catalyst takes place by stripping the catalyst with steam. After separation of hydrocarbons from the catalyst, the catalyst finally is introduced into a regeneration zone where carbonaceous residues are removed by burning with air or other oxygen-containing gas. After regeneration, hot catalyst from the regeneration zone is reintroduced into the transfer line reactor to contact fresh hydrocarbon feed.

As stated, state of the art catalytic cracking catalysts are highly active. With the introduction of these highly active catalysts the first separation zone has become a limiting unit operation. When the catalyst is not rapidly separated from vapor and the vapor quenched once the desired reactions have taken place, the cracking reactions continue with the concomitant production of less desirable products. Riser rough-cut cyclones have been used as a first separation stage between catalyst and vapor, followed by finer cut cyclones to remove fines from the vapor.

Riser rough-cut cyclones have enjoyed only limited success. The first limitation on their success is size. Fluid catalytic cracking unit throughput expansions have been limited by rough-cut cyclone size, which can become too large to be contained efficiently in the reactor vessel. The second limitation is reduction in separation efficiency at turn down rates. Riser rough cut cyclone efficiency is significantly reduced at low rates and reduced inlet velocity. Conversely at high catalyst loading, rough cut cyclones can overload or bridge and loose efficiency.

U.S. Pat. 4,664,888 teaches an improvement in the art of catalyst separation in a fluid catalytic cracking process.

DETAILED DESCRIPTION OF THE DRAWINGS

Figure 1:
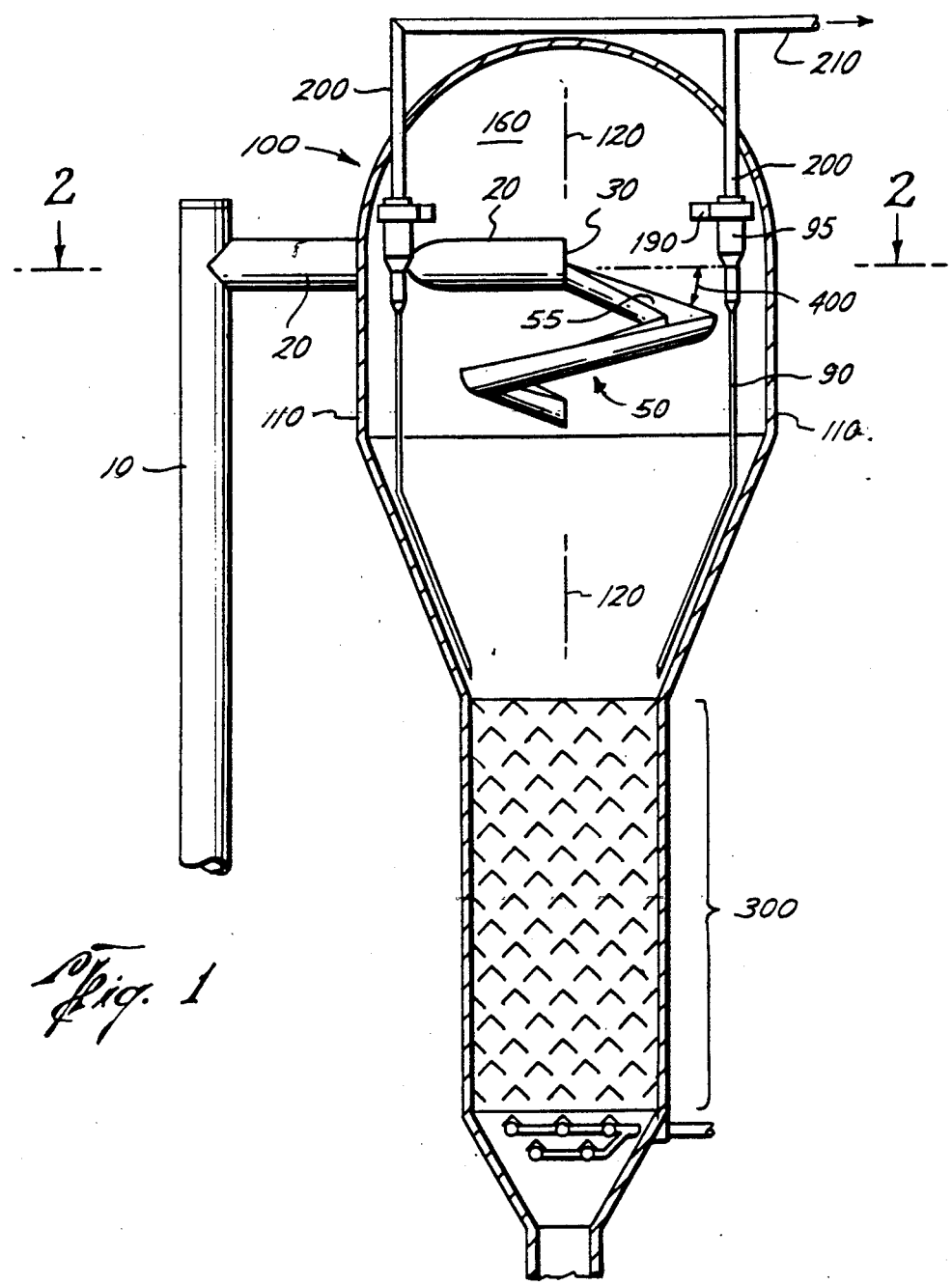
FIG. 1 is a side view of a separator apparatus in a fluid catalytic cracking stripper vessel.
Figure 2:
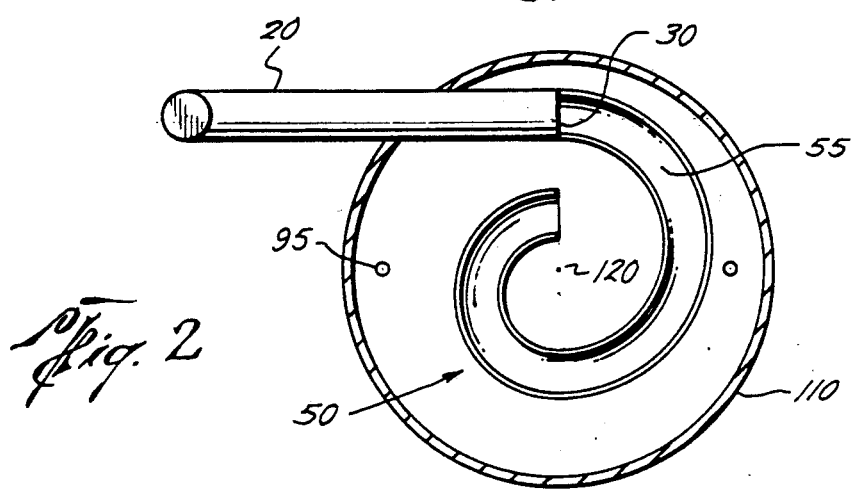
FIG. 2 is a view of the separator apparatus along section 2—2 in FIG. 1.

In order to demonstrate and provide a better understanding of the invention, reference is made to FIGS. 1 and 2.

A fluid catalytic cracking riser reactor 10 contains an upward flowing mixture of cracked product vapor and catalyst. Riser reactor 10 comprises a transitional portion 20 which traverses the wall 110 and enters reactor vessel 100 tangential to the circumference of wall 100, seen in FIG. 2. Riser reactor 10 terminates in a horizontal discharge outlet 30 which is connected to and provides fluid communication with separator apparatus 50. Separator apparatus 50 provides for the rapid disengagement and separation of catalyst from cracked vapor product in reactor vessel 100.

The separator apparatus 50 comprises a downwardly spiraling channel 55. The separator is located at the top and approximately at the horizontal center 120 of reactor vessel 100. The spiral channel has a U-shaped cross-section, open at the top. The major proportion of catalyst flows from horizontal discharge outlet 30, down channel 55, falling to stripper section 300. The cracked vapor product flows from horizontal discharge outlet 30 both straight toward wall 110 and upward toward vapor inlet 190 of cyclone separator 95. In cyclone separator 95, vapor is centrifugally separated from catalyst fines and vapor exits the reactor vessel 100 through outlet 200 into header 210. Separated catalyst fines cyclone separator dipleg 90 and is combined with catalyst in the stripping zone 300. A small amount of catalyst entrained by the vapor impinges the reactor wall 110 traveling downward along the wall to stripper section 300.

The separator comprises a downwardly spiraling channel. The channel has an angle of declination 400 from the horizontal of 15° to 45°, preferably 22.5° to 25°. The spiral is preferably ½ turn (180°) to a full turn (360°) about a vertical axis, in this drawing horizontal center 120 of reactor vessel 100.

SUMMARY OF THE INVENTION

A fluidized catalytic cracking apparatus comprises a riser reactor, a separator and a reactor vessel. The separator rapidly disengages and separates catalyst from cracked vapor product in the reactor vessel. The riser reactor has a transitional portion, traversing the wall of the reactor vessel. A horizontal discharge outlet provides fluid communication with the separator. The separator comprises a downwardly spiraling channel.

The invention is shown by way of example.

EXAMPLE

A separator apparatus will be constructed according to FIG. 1 and FIG. 2.

Reactor vessel has a height of 40 ft. The diameter of the upper section of the vessel is 25 ft. and the diameter of the stripper is 10 ft.

The riser reactor extends to an elevation of 136 feet at the uppermost end. A transitional portion having an internal diameter of 33 inches traverses the reactor vessel wall and discharges catalyst into the catalyst-vapor separator.

The separator is a U-shaped downwardly spiraling channel having a height of 14 ft. and an angle of declination from the horizontal of 25°. The spiral turns 360° having an 84" radius at the top and a 36" radius at the bottom, measured from the vertical axis of the reactor vessel, around which it spirals.

The principles, preferred embodiments and modes of operation of the present invention have been described in the foregoing specification. However, the invention which is intended to be protected is not to be construed as limited to the particular embodiments disclosed. The embodiments are to be regarded as illustrative rather than restrictive. Variations and changes may be made by others without departing from the spirit of the present invention. Accordingly, it is expressly intended that all such variations and changes which fall within the spirit and scope of the present invention as defined in the following claims be embraced thereby.

What is claimed is:

1. A fluidized catalytic cracking apparatus comprising a reactor vessel, a riser reactor outisde said vessel and a separator inside said vessel for rapidly disengaging and separating catalyst from cracked vapor product, said riser reactor having a transitional portion traversing a wall of said reactor vessel and a horizontal discharge outlet in fluid communication with said separator, said separator comprising a downwardly spiraling open top channel of U-shape cross section.

2. The apparatus of claim 1 wherein the separator the downwardly spiraling channel has an angle of declination of 15° to 45° from the horizontal.

3. The apparatus of claim 1 wherein the separator the downwardly spiraling channel has an angle of declination of 22.5° to 25° from the horizontal.

4. The apparatus of claim 1 wherein the separator the downwardly spiraling channel turns 180° to 360° about a vertical axis.

5. The apparatus of claim 1 wherein the separator downwardly spiraling channel has an angle of declination 22.5° to 25° from the horizontal and turns 180° to 360° about a vertical axis.

* * * * *